United States Patent Office 3,371,517
Patented Mar. 5, 1968

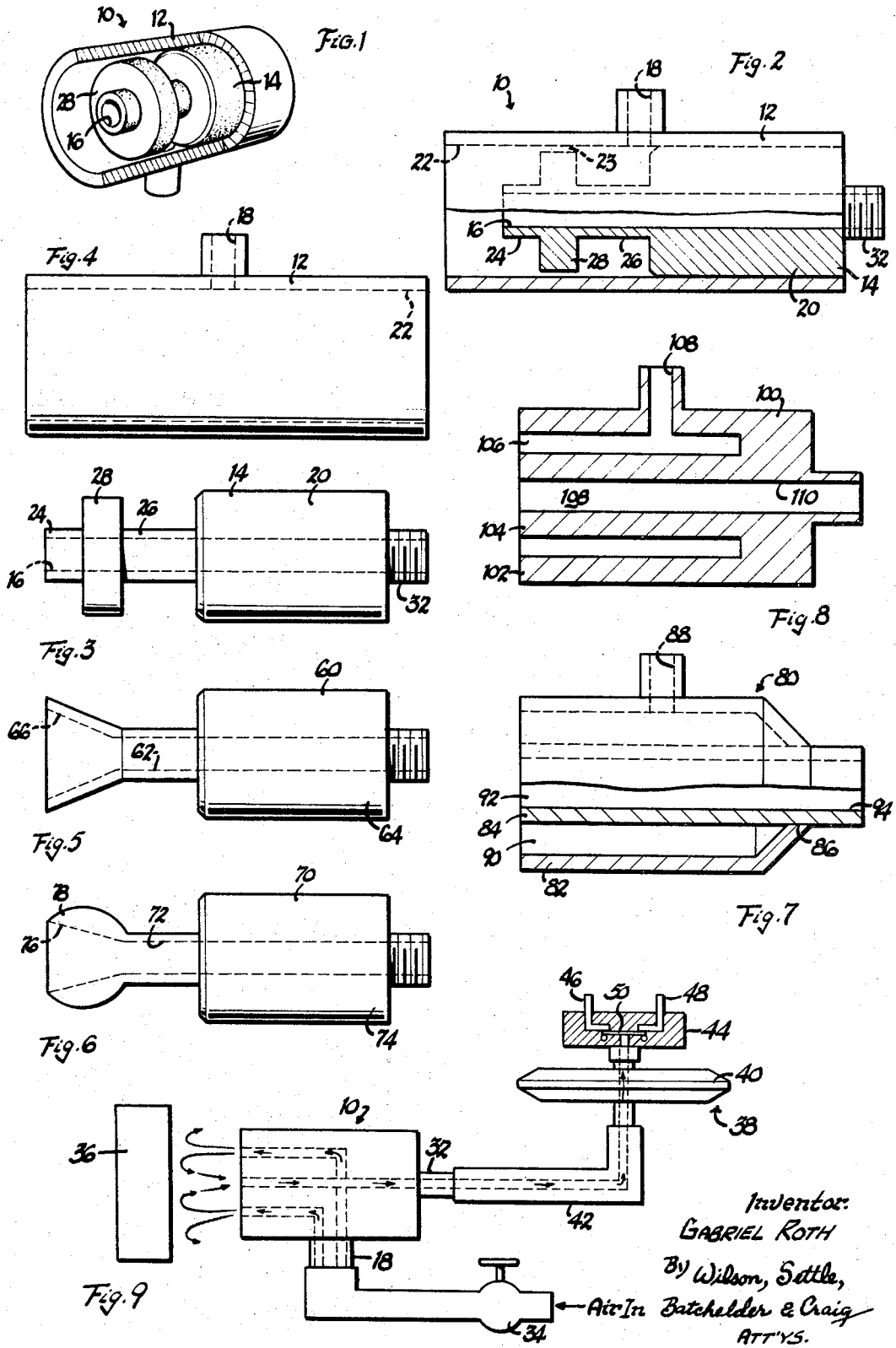

3,371,517
METHOD OF AND APPARATUS FOR PROXIMITY SENSING
Gabriel Roth, 6840 Roby, Union Lake, Mich. 48085
Filed Feb. 1, 1966, Ser. No. 524,020
2 Claims. (Cl. 73—37.5)

ABSTRACT OF THE DISCLOSURE

A sensing device for sensing the presence of an object at a given position by reflection of a gas stream directed against the object from a sensing head. The device includes an outlet passage and an inlet passage for reflected gas with the inlet passage being formed by an enlarged portion spaced from the outlet to reduce the turbulence of the gas flowing out of the sensing head.

---

This invention relates to sensing devices and methods, and in particular to a method of and apparatus for sensing the presence of an object at a given position by reflection of a gas stream directed against the object from a sensing head.

There are commercially available sensing devices which can be mounted next to a position for an object to be sensed and which supply an output signal when an object is present in that position. One known proximity sensing device of this type employs a magnetic field issued from a sensing head which is disturbed or altered when an object to be sensed is located within the magnetic field. The change of the magnetic field causes the sensing head to supply an electrical output signal which is fed to a control device to perform whatever control function may be desired. The control function might for example be to stop a moving member, or to actuate a press, or to perform any other desired control or switching function. Such electro-magnetic sensing devices require complex electrical components and they are expensive. There has been a need for a less expensive proximity sensing apparatus which performs at least as well as available electro-magnetic devices and yet which is less complex and lower in cost.

The method and apparatus of the present invention employ a sensing head from which a stream of gas is directed towards a position for an object to be sensed. When an object is located at that position, gas from the stream is reflected and flows along a flow path in a different direction and separated from the gas stream to a utilization device. The utilization device responds to the flow or pressure of the reflected gas and may perform any desired control function such as a switching function. Preferably, the flow path of the reflected gas lies concentrically within the flow path of the gas stream which issues from the sensing head. Thus, the gas stream may flow along an annular flow path towards the object to be detected, and the reflected gas flows back through the center of the annular path and countercurrent thereto.

Briefly, the steps of the method of the invention are as follows:

(a) Flowing gas under pressure along a first flow path to form a gas stream, (b) Directing the gas stream toward a position for an object to be sensed such that when an object is present at that position, gas from the stream is reflected from the object, (c) Intercepting gas reflected from the object and causing the reflected gas to flow along a second flow path separate from and in a different direction than the first flow path, and (d) Directing the reflected gas to a device which is responsive to the flow or pressure of the reflected gas to perform a control function.

Preferably, the first flow path has an annular configuration, and the second flow path extends concentrically within the first flow path, the reflected gas flowing countercurrent to the gas stream flowing in the first flow path. The utilization device may have a diaphragm which responds to the pressure of the reflected gas to operate an electrical switch which in turn initiates an appropriate control function.

The sensing head itself has a first passage, preferably annular in configuration, through which gas from a source flows to issue from the sensing head in the form of a directional gas stream. The sensing head also has a second passage, preferably lying concentrically within the first passage but separated therefrom, to receive gas which has been reflected from an object and to direct the reflected gas to a utilization device. The utilization device may be actuated by the pressure or the flow of the reflected gas produced either when the object being sensed enters the gas stream or that produced when the object leaves the gas stream.

Accordingly, it is an object of the present invention to provide a low cost sensing apparatus.

Another object of the invention is to provide a device which senses the presence of objects by reflection of a gas stream directed towards the object.

A further object of the invention is to provide a method of sensing objects wherein gas under pressure is directed toward an object and gas reflected from the object is intercepted and directed to a utilization device which responds to the pressure or flow of the reflected gas to perform a control function.

Another object of the invention is to provide a sensing head wherein gas under pressure flow through a first passage and is directed thereby into a gas stream which may be directed toward an object to be sensed, the head further including a second passage through which gas reflected from the object may flow to a utilization device.

Another object of the invention is to provide a sensing head wherein reflected gas flows through a passage which lies concentrically within an annular passage for directing gas toward the object to be sensed.

Other objects of this invention will appear in the following description and appended claims, reference being had to the accompanying drawings forming a part of this specification wherein like reference characters designate corresponding parts in the several views.

On the drawings:

FIGURE 1 is a perspective view, partly broken away, of a sensing head in accordance with one embodiment of the invention;

FIGURE 2 is an elevational view, partly in section, of the sensing head of FIGURE 1;

FIGURE 3 is an elevational view of a core part of the sensing head of FIGURES 1 and 2;

FIGURE 4 is an elevational view of a sleeve part of the sensing head of FIGURES 1 and 2;

FIGURE 5 is an elevational view of a modification of the core of FIGURE 3;

FIGURE 6 is an elevational view of another modification of the core of FIGURE 3;

FIGURE 7 is an elevational view of a sensing head in accordance with another embodiment of the invention;

FIGURE 8 is a vertical sectional view of a sensing head constituting a further embodiment of the invention; and FIGURE 9 is a schematic diagram of sensing apparatus having a sensing head and a utilization device in accordance with the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

Referring first to FIGURES 1 through 4 inclusive, there is shown a sensing head 10 which includes an outer sleeve 12 and an inner core 14 disposed within the sleeve. The core 14 has a bore 16 extending axially through the same providing a passage for flow of reflected gas. The gas which is used in the illustrated embodiments of the invention is air. Air under pressure is supplied to an inlet 18 which extends from the outside of the sensing head through the sleeve 12 into the interior of the sleeve. The core 14 has a plug portion 20 which fits tightly within the interior surface 22 of the sleeve 12 so that the plug blocks flow of air to the right as viewed in FIGURE 2.

The core 14 also includes two reduced diameter portions 24 and 26 on opposite sides of a larger diameter portion 28 which is only slightly smaller in diameter than the interior surface 22 of the sleeve 12. There is a small space 23 between the periphery of enlarged portion 28 and the inner surface 22 of the sleeve so that air introduced through the inlet 18 can flow to the left through this small space and issue from the outlet end of the sleeve 12 which is at its left end as viewed in FIGURE 2.

Thus, sleeve 12 and core 14 form a first annular passage, and gas entering the sleeve through inlet 18 flows to the left through the annular passage and out through the outlet portion of the sleeve in the form of a hollow stream of air. When this stream of air impinges on an object to be detected, some of the air is reflected back through the center of the hollow stream and is intercepted by the passage 16 which extends centrally through the core 14. The latter passage 16 has an outlet 32 which may be threaded as shown for connection to a conduit.

The manner in which gas flows through the sensing head 10 is illustrated in FIGURE 9. Gas under pressure flows through a valve 34 into the inlet 18 of the sensing head 10. This gas is directed into an annular flow path within the sensing head and provides a primary flow to the left through the outlet of this annular flow path toward an object 36 to be sensed. The gas issues from the sensing head 10 in the form of a gas stream which may be considered as having a hollow configuration. As shown by the directional arrows, gas is reflected from the object 36 and some of this gas flows centrally through another flow path which extends through the first flow path and countercurrent thereto.

This reflected gas flows as a secondary flow through the second central passage to an outlet 32 which is connected by a hose to a utilization device 38. The utilization device may be a device which responds to a change in pressure of the reflected gas to perform a switching function and such a device is illustrated schematically in FIGURE 9.

The device 38 includes a diaphragm 40 which receives reflected gas from the conduit 42. On the upper side of diaphragm 40 there is shown an electrical switch 44 which has fixed terminals 46 and 48 and a movable contact 50 connected to the diaphragm 40. When the diaphragm 40 changes its position in response to a change in pressure of the reflected gas, the movable contact 50 either opens or closes the current path between terminals 46 and 48 and thus performs a switching function. The electrical switch 44 may be connected to any control apparatus and will serve to initiate the desired control function.

FIGURE 5 shows a slightly modified core 60 which may be used with the sleeve 12 in place of core 14. The core 60 has a bore 62 extending through the same and has a plug 64 like the plug 20 of core 14. The difference between core 60 and core 14 is that the former has a conically shaped portion 66 at the inlet end thereof, and the outside diameter of this conical portion is slightly smaller than the diameter of the interior surface 22 of sleeve 12 to provide an outer annular passage for flow of a gas stream to be directed toward an object. Reflected gas flows through the bore 62 and thus flows within and countercurrent to the gas stream which flows through the outer passage in the sensing head.

The core 70 of FIGURE 6 is very similar to the core 60 of FIGURE 5. The core 70 has a plug portion 74 which fits tightly with the interior surface 22 of sleeve 12 in the same manner as has been described previously. The core 70 also has an internal bore 72 defining a passage for the flow of reflected gas. The inlet end 76 of this passage is tapered conically, and the exterior surface 78 of the inlet has a convexly curved configuration which may reduce the turbulence of the gas flowing out of the sensing head.

FIGURE 7 shows a sensing head 80 in accordance with another embodiment of the invention which includes an outer tube 82 and an inner tube 84 disposed concentrically within the outer tube. The two tubes 82 and 84 may be joined together, for example by brazing as shown at 86. The space between tubes 82 and 84 provides a first passage 90 for flow of air supplied from a source through an inlet opening 88 which communicates with the passage 90. It is evident that the passage 90 has an annular configuration such that gas flowing through this passage and issuing from the left end of the sensing head will follow an annular path toward the object to be detected. Gas reflected from the object will flow centrally back through an inner passage 92 defined by a bore 94 extending through the inner tube 84. The reflected gas thus flows countercurrent to and within the gas flowing through the outer passage 90 as in the other embodiments of the invention.

FIGURE 8 shows a unitary embodiment of the invention wherein the sensing head 100 includes an outer tube 102 and an inner tube 104 which are both part of the same piece of material. The material of the sensing head 100 may be metal or for some applications plastic material is satisfactory. The two tubes 102 and 104 are spaced apart to provide an annular passage 106 between them. An inlet 108 extends from the exterior of the sensing head through tube 102 to the annular passage 106. The sensing head 100 also has a central passage 108 defined by a bore 110 extending through the inner tube 104. Again, gas which is reflected from the object being detected flows through passage 108 countercurrent to the direction of gas flow through passage 106.

Thus, the invention provides a method of and apparatus for sensing the presence of an object by directing a stream of gas against the object, intercepting gas reflected from the object and directing that reflected gas to a utilization device. The simplicity of the method and device is one of its advantages; it means that the device can be manufactured economically and sold at a reasonably low price. Yet, the device is very reliable in operation and is versatile in that there are many applications in which it can be used.

I claim:

1. Sensing apparatus for use with a source of pressurized gas comprising a sensing head having a first passage therein including an inlet for connection to said source of pressurized gas and an outlet which is generally annular in configuration for issuing pressurized gas from said sensing head in the form of a directional gas stream, said first passage being annular in a section normal to the axis thereof, said sensing head further having a second passage therein which is circular in a section normal to the axis thereof and lies concentrically with said first passage but separated therefrom, said second passage having an inlet located centrally within but separated from the outlet of said first passage which inlet tapers from a larger diameter at the entrance thereof to a smaller diameter at a medial portion of said second passage, so that said second passage inlet receives only gas of said stream reflected from an external object, said second passage further including an outlet from which reflected gas issues in the operation of said head, and a utilization device connected to said outlet of said second passage.

2. Sensing apparatus for use with a source of pressurized gas comprising a sensing head having a first passage including an inlet for connection to said source of pressurized gas an an outlet which is generally annular in configuration for issuing pressurized gas from said sensing head in the form of a directional gas stream, said first passage being annular in a section normal to the axis thereof, said sensing head further having passage forming means providing a second passage which means is circular in a section normal to the axis thereof and lies concentrically within said first passage and includes an enlarged portion at one end engaging the wall of said first passage, an annular portion spaced from the wall of the first passage and said enlarged portion and positioned adjacent to said inlet and a second enlarged portion spaced from said first enlarged portion and in close proximity to said wall of said annular portion to control the flow of gas entering said outlet said second passage having an inlet located concentrically within but separated from said outlet of said first passage so that said second passage inlet receives only gas of said stream reflected from an external object, said second passage further including an outlet from which reflected gas issues in the operation of said head and an utilization device connected to said outlet of said second passage.

References Cited

UNITED STATES PATENTS

| | | |
|---|---|---|
| 2,900,468 | 8/1959 | Joy. |
| 3,194,055 | 7/1965 | Knobel _____ 73—37.5 |

FOREIGN PATENTS

| | | |
|---|---|---|
| 879,466 | 6/1953 | Germany. |

LOUIS R. PRINCE, *Primary Examiner.*

W. M. HENRY, *Assistant Examiner.*